United States Patent [19]

Ho et al.

[11] 4,357,427

[45] Nov. 2, 1982

[54] ECONOMIC PREPARATION OF ALUMINA SUITABLE FOR ISOSTATIC PRESSING AND SINTERING

[75] Inventors: Shih-Ming Ho, Penn Hills; Bulent E. Yoldas, Churchill Borough; Douglas M. Mattox, Forest Hills, all of Pa.

[73] Assignee: Westinghouse Electric Corp., Pittsburgh, Pa.

[21] Appl. No.: 312,575

[22] Filed: Oct. 19, 1981

[51] Int. Cl.$^3$ .............................................. C04B 35/44
[52] U.S. Cl. ................................... 501/153; 264/332; 501/152
[58] Field of Search ............................... 501/152, 153

[56] References Cited

U.S. PATENT DOCUMENTS

| | | | |
|---|---|---|---|
| 3,026,210 | 3/1962 | Coble | 501/153 |
| 3,941,719 | 3/1976 | Yoldas | 423/625 |
| 4,150,317 | 4/1979 | Laska | 501/153 |
| 4,266,978 | 5/1981 | Prochazka | 501/153 X |
| 4,318,995 | 3/1982 | Rhodes et al. | 501/153 X |

OTHER PUBLICATIONS

Yoldas, B. E., "Alumina Sol Preparation from Alkoxides", Bull. Am. Cer. Soc. 54 (3) Mar. 1975, pp. 289–290.

Primary Examiner—Helen M. McCarthy
Attorney, Agent, or Firm—W. D. Palmer

[57] ABSTRACT

Method for preparing finely divided high purity alumina doped with a small predetermined percentage of magnesia. In the preparation, there is first formed a mixed clear solution of aluminum alkoxide and a small amount of magnesium in the form of alkoxide or water soluble magnesium salt. There is then included with the clear solution a substantial excess of water over that required to completely hydrolyze the alkoxide and there is added thereto a small amount of selected acid which is effective to peptize the resulting slurry. The formed milky slurry is then allowed to become fully peptized to form a clear sol. The clear sol is converted to a finely divided and dried powder either by forming the sol into a gel, which is then dried, and mechanically reduced to a powder status or by spray drying the sol at elevated temperatures which produces the dried powder. Thereafter, the finely divided and dried powder is calcined at a temperature of from about 700° C. to about 900° C., with the crystalline structure of the powder predominately being that of a delta alumina. The preparation of this alumina is very economic and the resulting material is suitable for being isostatically pressed into a tubular form and then sintered to translucent tubular form to a density which closely approaches theoretical.

7 Claims, No Drawings

ECONOMIC PREPARATION OF ALUMINA SUITABLE FOR ISOSTATIC PRESSING AND SINTERING

BACKGROUND OF THE INVENTION

This invention relates to the preparation of high purity alumina and, more particularly, to the preparation of such alumina which is suitable for being isostatically pressed into tubular form and then sintered to translucent light-transmitting tubular form to a density which closely approaches theoretical.

U.S. Pat. No. 3,026,210, dated Mar. 20, 1962 to Coble discloses an alumina polycrystalline body which includes a small amount of magnesia and which has a density which closely approaches theoretical. This material is highly transmissive for visible radiations and it is particularly adapted to be formed into sintered tubular configuration for use as an envelope for discharge devices. Such an application is disclosed in U.S. Pat. No. 4,150,317, dated Apr. 17, 1979 to Laska.

U.S. Pat. No. 3,941,719, dated Mar. 2, 1976 to Yoldas, one of the present applicants, discloses the preparation of a clear hydrolyzed aluminum alkoxide sol which can be dried and pyrolyzed to form a pure alumina which is useful as a catalyst, absorbent and desiccant. The intermediate product, which may be a sol or a gel can also be used to coat substrates. A related disclosure is set forth in The American Ceramic Society Bulletin, Vol. 54, No. 3, March, 1975, pp. 289-290, article by B. E. Yoldas.

Heretofore, very finely divided alumina has been spray dried prior to isostatic pressing, and this has permitted a higher bulk density to be obtained in the pressed and unsintered compact. Spray drying apparatus is readily available commercially and a typical spray drying apparatus for use with finely divided materials is schematically shown in U.S. Pat. No. 3,023,339, dated Feb. 27, 1962 to Vodoklys. Heretofore, finely divided aluminas suitable for isostatic pressing have been prepared by a variety of processes and a typical preparation process involves the calcination of a hydrated inorganic aluminum salt, such as an alum. The calcination temperature is sufficiently high that the salt is decomposed, which voids the water of crystallization and other gaseous decomposition products, such as $SO_3$ in the case of the sulfate component, leaving a fine particulate powder, substantially all of which is in the high temperature crystalline form of alumina (alpha).

SUMMARY OF THE INVENTION

There is provided a method for preparing finely divided alumina doped with a small predetermined percentage of magnesia and which is suitable for being isostatically pressed into tubular form and then sintered to translucent light-transmitting tubular form to a density which closely approximates theoretical. In accordance with the method of preparation, there is first formed a mixed clear solution substantially comprising a predetermined amount of aluminum alkoxide of the formula $Al(OR)_3$ where R contains from one to six carbon atoms and a predetermined amount of water soluble magnesium salt which will decompose on heating to magnesia or magnesium alkoxide of the formula $Mg(OR)_2$ where R contains from one to six carbon atoms, and wherein the atom ratio of Al to Mg in the mixed solution is that atom ratio which is desired in the prepared finely divided magnesia-doped alumina. There is then included with the mixed clear solution a substantial excess of water over that amount required to completely hydrolyze the alkoxide present and this forms a milky slurry. There is added to the milky slurry a small predetermined amount of selected acid which is effective to peptize the slurry. The resulting formed milky slurry is allowed to stand until it becomes fully peptized and forms a clear sol. The clear sol is then converted to finely divided and dried powder either by spray drying the sol at a temperature above the boiling temperature of water or by converting the sol to a gel, drying the gel, and physically reducing the resulting dried material to finely divided powder form. Thereafter, the formed finely divided and dried powder is calcined at a predetermined time at a temperature in the range from about 700° C. to about 900° C., with the crystalline structure of the calcined powder predominately being that of delta alumina.

DESCRIPTION OF THE PREFERRED EMBODIMENTS

The present market for high-pressure-sodium lamps is very large and continues to grow rapidly. Such lamps utilize a sintered polycrystalline alumina arc tube since most other materials are rapidly attacked by the high temperature sodium. These arc tubes are prepared by first isostatically pressing fine alumina powder and the pressed compact is then sintered at a very high temperature to a density which closely approaches theoretical. The powder which is used to prepare the arc tube id derived from salts and the preparation of the high purity alumina is an appreciable cost item in preparing the arc tubes.

Metal alkoxides such as aluminum alkoxides are readily available commercially and are relatively inexpensive. In accordance with the present invention, these alkoxides are used to prepare the finely divided alumina powder. The starting material is aluminium alkoxide of the formula $Al(OR)_3$ where R contains from one to six carbon atoms. The preferred starting material is aluminum butoxide $Al(OC_4H_9)_3$. To this is added a small predetermined amount of magnesium in the form of water soluble magnesium salt which will decompose on heating to magnesia or magnesium alkoxide of the formula $Mg(OR)_2$ where R contains from one to six carbon atoms. As a typical example, magnesia ethoxide $Mg(OC_2H_5)_2$ will be considered.

Considering a specific example, 0.4 gram of magnesium ethoxide powder is well mixed into 250 grams of liquid aluminum butoxide at a temperature of approximately 70° C. This temperature is maintained until the magnesium compound is completely dissolved and a clear solution is obtained. The amount of magnesium with respect to the aluminum can vary and the purpose of the magnesia in the mixture is to serve as a grain growth inhibitor during the sintering process. As a specific example, the magnesia in the final material can constitute 0.25 weight percent of the alumina and this ratio will be considered herein, with the atom ratio of aluminum to magnesium in the initial mixed solution being that atom ratio which is desired in the prepared finely divided magnesia-doped alumina.

There is then included with the mixed clear solution of aluminum-magnesium alkoxides, a substantial excess of water over that amount required to completely hydrolyze the alkoxide present. As a specific example, 1800 ml of water is heated to a temperature of 70° C.

and the previously mixed aluminum-magnesium alkoxide clear solution is slowly added to the water which forms a milky slurry. There is then added thereto a small predetermined amount of selected acid which is effective to peptize the slurry. As a specific example, 5 grams of concentrated nitric acid is slowly added to the foregoing milky slurry and thoroughly mixed therein. The resulting mixture is allowed to stand to become fully peptized and there is formed a clear sol. A typical time needed to form the clear sol is 24 hours.

In the next step of preparation, the formed clear sol is converted to a finely divided and dried powder. This is accomplished by using a spray drying technique or by converting the sol to a gel, drying the gel, and physically reducing the resulting dried material to finely divided powder form. When using the spray drying technique, the sol is spray dried at a temperature about the boiling temperature of water so that the sol immediately converts to the dried powder which is collected. As a specific example, the sol is introduced through a rotating atomizer in a spray dryer into air which is heated to a temperature of 295° C. and the sol immediately flashes into a dried condition upon being atomized, with the dried powder conveyed via the heated airstream into a cyclone separator where it is collected. The temperature of the air at the end of the drying cycle can be approximately 150° C. so that the final powder is completely dried. Alternatively, water is evaporated from the sol until it converts to a transparent gel. The gel is then dried by heating same to a temperature of 300° C. for a period of 4 hours for example. The completely dried material is then physically reduced or ground to finely divided powder form. A typical state of division for the dried power is such that it will pass a 100 mesh sieve.

In the final step of preparation, the finely divided and dried powder is calcined for a predetermined time at a temperature in the range of from about 700° C. to about 900° C., with the crystalline structure of the calcined powder predominately being that the delta alumina. As a specific example, the foregoing dried powder is heated in an air atmosphere at a temperature of 800° C. for a period of 2 hours. The final calcining temperature is important with respect to forming a powder suitable for sintering to a density which approaches theoretical. A calcining temperature which exceeds about 900° C. will result in small enclosed pores in the bodies of the powder particles which will be difficult to remove in the final sintering. Calcining temperatures less than about 700° C. result in increased pore volume and pore surface area in the particles, both of which are undesirable for best results on final sintering. The final material is predominately delta alumina which is readily sinterable. A typical average grain size for the final calcined material is in the order of 0.05 to 0.1 micron.

Because of the simplicity of the processing steps and the relatively low cost of the starting alkoxide materials, the present process permits substantial reductions in powder costs.

Modifications of the present process are possible. It is desirable in some cases to supplement the magnesia doping with a small amount of yttria doping. This is readily accomplished by adding a small predetermined amount of yttrium in the form of water soluble yttrium salt which will decompose to yttria on heating or yttrium alkoxide of the formula $Y(OR)_3$ where R contains from one to six carbon atoms. This yttrium compound additive is included with the initial solution. As a specific example, the yttrium in the form of the ethoxide is included in the initial solution so that it constitutes 30 weight molar percent, expressed as the oxide, measured with respect to the relative amount of magnesium, expressed as equivalent oxide, which is incorporated in the initial solution.

The water soluble salts of magnesium and yttrium which can be substituted for the alkoxides and which will decompose to the respective oxides on heating are yttrium or magnesium acetate, yttrium or magnesium chloride, and yttrium or magnesium nitrate.

The amount of acid which is utilized to completely peptize the initial solution is not critical. In addition, other acids can be substituted for the preferred nitric acid, such other acids being hydrochloric, perchloric, acetic, and trichloroacetic.

We claim:

1. The method of preparing finely divided alumina doped with a small predetermined percentage of magnesia and which is suitable for being isostatically pressed into tubular form and then sintered to translucent light-transmitting tubular form to a density which closely approximates theoretical, which method comprises:

forming a mixed clear solution substantially comprising a predetermined amount of aluminum alkoxide of the formula $Al(OR)_3$ where R contains from one to six carbon atoms and a small predetermined amount of water soluble magnesium salt which will decompose on heating to magnesia or magnesium alkoxide of the formula $Mg(OR)_2$ where R contains from one to six carbon atoms, and wherein the atom ratio of Al to Mg in said mixed solution is that atom ratio which is desired in the prepared finely divided magnesia-doped alumina;

including with the mixed clear solution a substantial excess of water over that amount required to completely hydrolyze the alkoxide present to form a milky slurry and adding thereto a small predetermined amount of selected acid which is effective to peptize said slurry, and allowing the formed milky slurry to become fully peptized and form a clear sol;

converting the formed clear sol to a finely divided and dried powder; and calcining the finely divided and dried powder for a predetermined time at a temperature in the range of from about 700° C. to about 900° C., with the crystalline structure of the calcined powder predominately being that of delta alumina.

2. The method as specified in claim 1, wherein said formed clear sol is converted to a finely divided and dried powder by evaporating sufficient water from said sol to convert same to a gel, drying the gel, and physically reducing the resulting dried material to finely divided powder form.

3. The method as specified in claim 1, wherein said formed clear sol is converted to a finely divided and dried powder by spray drying said sol at a temperature above the boiling temperature of water.

4. The method as specified in claims 2 or 3, wherein a small predetermined amount of yttrium in the form of water soluble yttrium salt which will decompose to yttria on heating or yttrium alkoxide of the formula $Y(OR)_3$ where R contains from one to six carbon atoms is also included as a part of said initial mixed clear solution.

5. The method as specified in claim 1, wherein said aluminum alkoxide is aluminum butoxide, said magnesium alkoxide is magnesium ethoxide, and said selected acid is nitric acid.

6. The method as specified in claim 1, wherein said selected acid is one of nitric, hydrochloric, perchloric, acetic and trichloroacetic.

7. The method as specified in claim 1, wherein said magnesium salt is at least one of magnesium acetate, magnesium chloride and magnesium nitrate.

* * * * *